(12) United States Patent
Wang et al.

(10) Patent No.: US 12,165,502 B2
(45) Date of Patent: Dec. 10, 2024

(54) DRIVING MECHANISM

(71) Applicant: TDK TAIWAN CORP., Taoyuan (TW)

(72) Inventors: Chao-Hsi Wang, Taoyuan (TW); Lien-Yu Huang, Taoyuan (TW); Yu-Chi Kuo, Taoyuan (TW); Xuan-Huan Su, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 135 days.

(21) Appl. No.: 17/943,499

(22) Filed: Sep. 13, 2022

(65) Prior Publication Data
US 2023/0083653 A1    Mar. 16, 2023

Related U.S. Application Data (60) Provisional application No. 63/243,879, filed on Sep. 14, 2021.

(51) Int. Cl.
| | | |
|---|---|---|
| *G08B 6/00* | (2006.01) | |
| *G02B 7/04* | (2021.01) | |
| *H02N 2/00* | (2006.01) | |
| *H04N 23/51* | (2023.01) | |
| *H04N 23/54* | (2023.01) | |
| *H04N 23/55* | (2023.01) | |
| *H04N 23/57* | (2023.01) | |
| *H04N 23/60* | (2023.01) | |

(52) U.S. Cl.
CPC ............. *G08B 6/00* (2013.01); *G02B 7/04* (2013.01); *H02N 2/001* (2013.01); *H04N 23/51* (2023.01); *H04N 23/54* (2023.01); *H04N 23/55* (2023.01); *H04N 23/57* (2023.01); *H04N 23/60* (2023.01); *G03B 2205/0069* (2013.01)

(58) Field of Classification Search
CPC . G08B 6/00; G02B 7/04; G02B 5/005; H02N 2/001; H04N 23/51; H04N 23/54; H04N 23/55; H04N 23/57; H04N 23/60; G03B 2205/0069; G06F 1/1626; G06F 1/1686
See application file for complete search history.

(56) References Cited

U.S. PATENT DOCUMENTS

| | | | |
|---|---|---|---|
| 6,498,624 B1* | 12/2002 | Ogura | G02B 17/04 |
| | | | 348/335 |
| 2013/0074666 A1* | 3/2013 | Kawada | B26F 1/44 |
| | | | 83/145 |
| 2017/0344054 A1* | 11/2017 | Huang | G06F 1/1669 |
| 2019/0138062 A1* | 5/2019 | Zeng | H04M 1/0235 |
| 2019/0163242 A1* | 5/2019 | Zeng | G06F 1/188 |

* cited by examiner

*Primary Examiner* — Christopher K Peterson
(74) *Attorney, Agent, or Firm* — Muncy, Geissler, Olds & Lowe, P.C.

(57) ABSTRACT

A driving mechanism is provided, including a base, a movable unit, a magnetic element, and a driving assembly. The movable unit is movably disposed on the base. The magnetic element is disposed on the movable unit and has plastic material. The driving assembly is configured to drive the movable unit to move relative to the base, wherein the driving assembly has a coil, and the magnetic element and the movable unit move relative to the base when an electrical current is applied to the coil.

19 Claims, 8 Drawing Sheets

DRIVING MECHANISM

CROSS REFERENCE TO RELATED APPLICATIONS

This application claims the benefit of U.S. Provisional Application No. 63/243,879, filed Sep. 14, 2021, the entirety of which is incorporated by reference herein.

BACKGROUND OF THE INVENTION

Field of the Invention

The present invention relates to a driving mechanism, and, in particular, to a driving mechanism that drives an optical element to move.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

In some electronic devices, to reduce the size of the shutter or aperture mechanism in a camera module can be difficult. Therefore, addressing the aforementioned problems has become a challenge.

BRIEF SUMMARY OF THE INVENTION

An embodiment of the present invention provides a driving mechanism that includes a base, a movable unit, a magnetic element, and a driving assembly. The movable unit is movably disposed on the base. The magnetic element is disposed on the movable unit and has plastic material. The driving assembly is configured to drive the movable unit to move relative to the base, wherein the driving assembly has a coil, and the magnetic element and the movable unit move relative to the base when an electrical current is applied to the coil.

In some embodiments, the magnetic element has a main body, a top portion, and a connecting portion extending through the movable unit and connecting the main body to the top portion.

In some embodiments, the top portion protrudes from a top surface of the movable unit.

In some embodiments, the movable unit has a flat structure, and the polar direction of the magnetic element is parallel to the movable unit.

In some embodiments, the main body has a central portion and a wall portion surrounding the central portion, and a recess is formed between the central portion and the wall portion.

In some embodiments, the main body further has a plurality of contact portions protruding from the wall portion in a vertical direction and contacting the base.

In some embodiments, the wall portion has a rectangular structure, and the main body has four contact portions located at the four corners of the wall portion.

In some embodiments, each of the contact portions has an L-shaped structure.

In some embodiments, when the magnetic element move relative to the base, the contact portions slide along a guide rail of the base.

In some embodiments, the main body has a stopper protruding from an outer surface of the wall portion.

In some embodiments, the movable unit has a longitudinal structure, and the stopper protrudes from the movable unit in a direction parallel to a short axis of the movable unit.

In some embodiments, the central portion of the main body has an end surface located adjacent to the coil of the driving assembly, and a central axis of the magnetic element extends through the end surface.

In some embodiments, the end surface is a rectangular or square flat surface.

In some embodiments, the movable unit forms a first hole and a second hole arranged along a long axis of the movable unit, and the magnetic element has two connecting portions extending through the first hole and the second hole.

In some embodiments, the first hole and the second hole are spaced apart from each other along the long axis.

In some embodiments, the first hole has a rectangular shape and forms a first small filleted corner and a first large filleted corner adjacent to each other, wherein the fillet radius of the first large filleted corner is greater than the fillet radius of the first small filleted corner.

In some embodiments, the second hole has a rectangular shape and forms a second small filleted corner and a second large filleted corner adjacent to each other, wherein the fillet radius of the second large filleted corner is greater than the fillet radius of the second small filleted corner.

In some embodiments, the first and second small filleted corners are located between the first and second large filleted corners.

In some embodiments, the magnetic poles of the magnetic element are located on opposite sides of the movable unit.

In some embodiments, the magnetic element comprises a plastic magnet, an injection magnet or magnetic powder.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
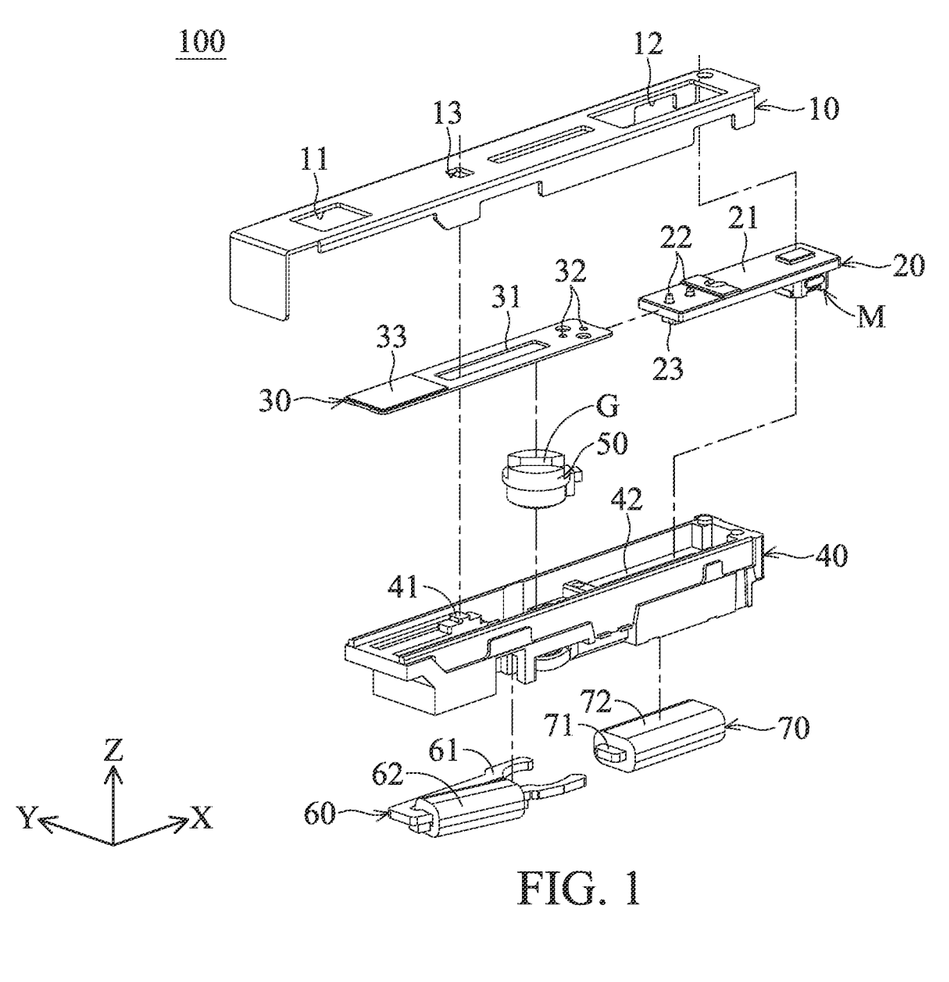
FIGS. 1 and 2 are exploded diagrams of a driving mechanism 100, in accordance with an embodiment of the invention.
Figure 2:
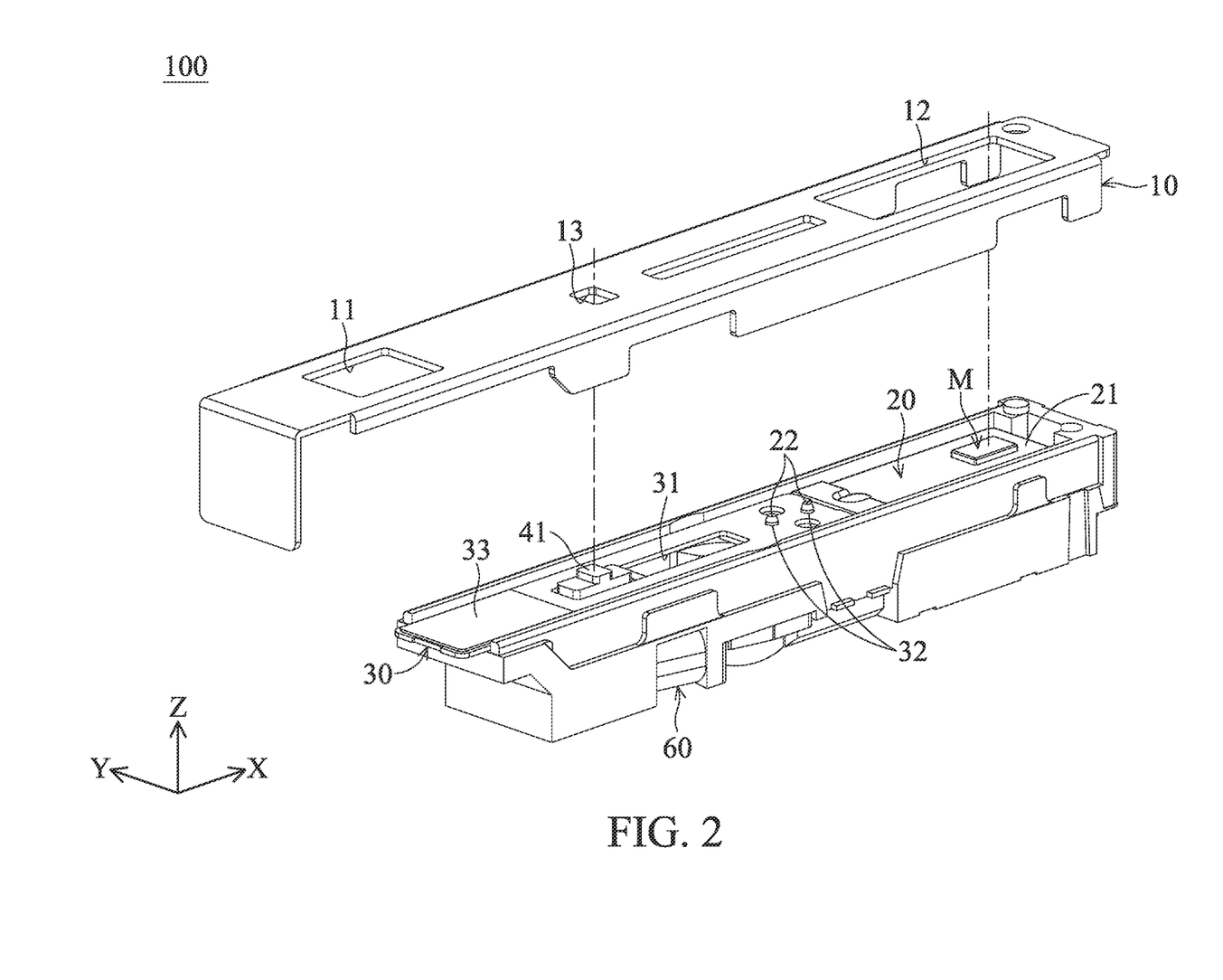
Figure 3:
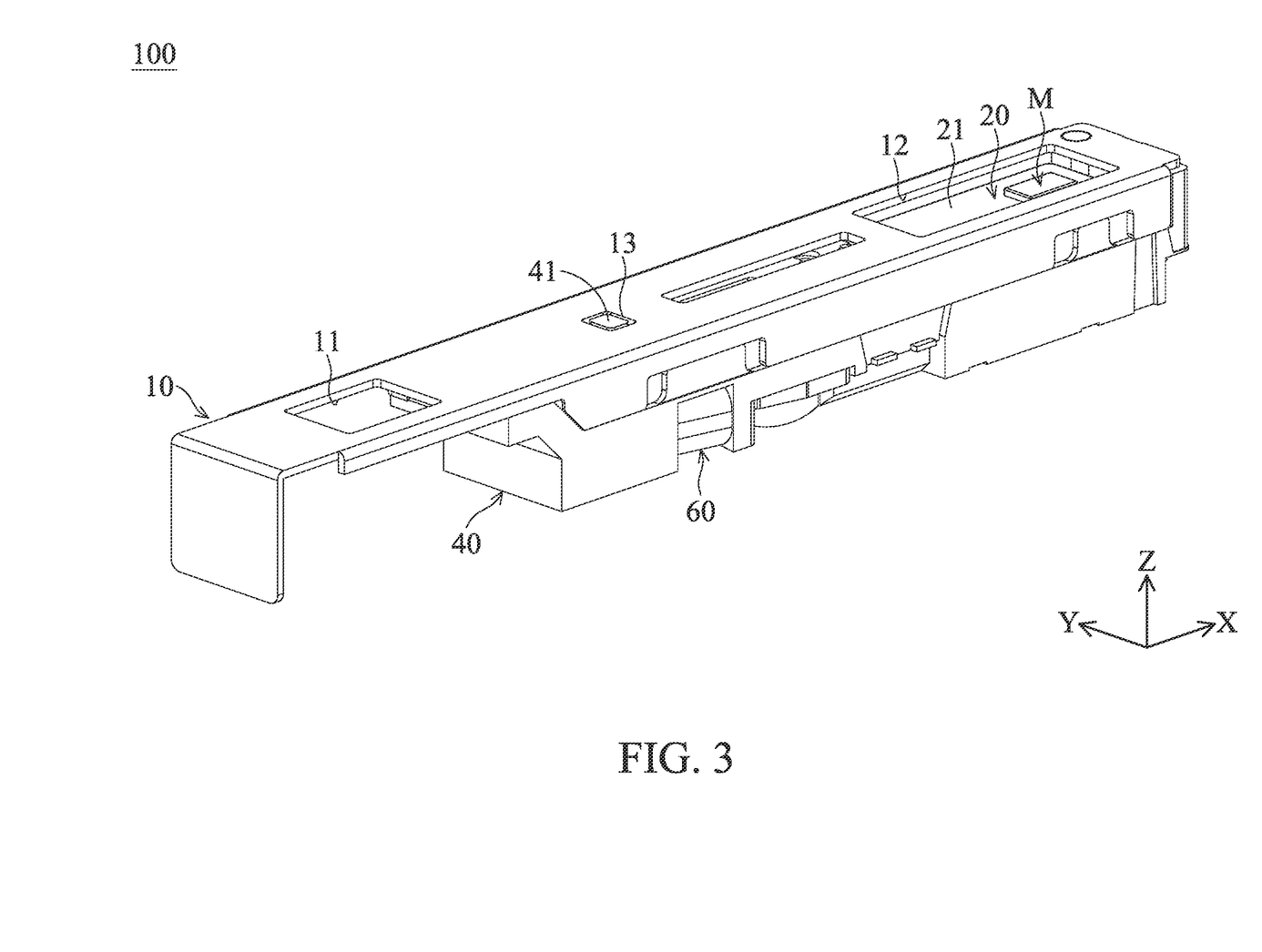
FIG. 3 is a perspective diagram of the driving mechanism 100 in FIGS. 1 and 2 after assembly.
Figure 4:
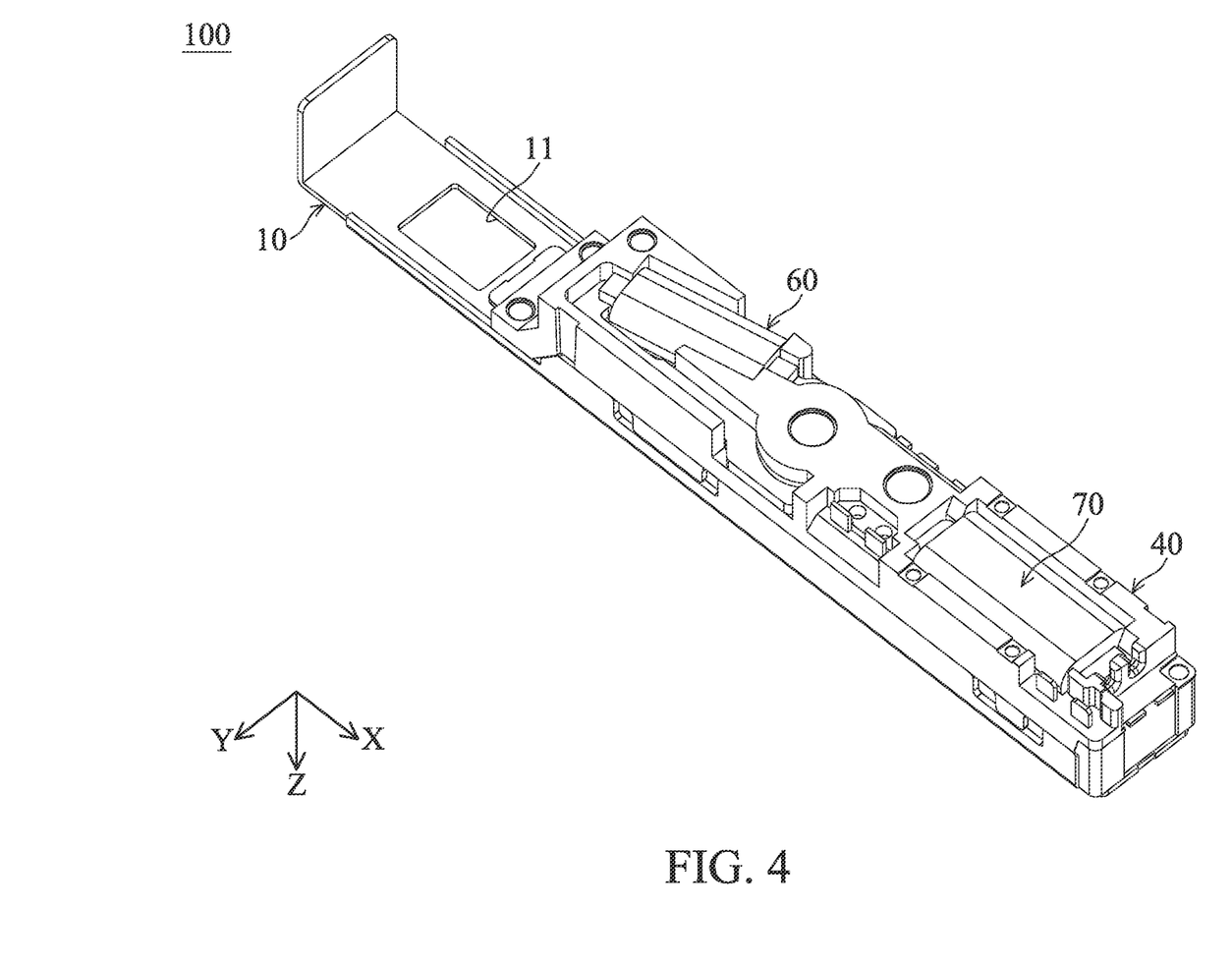
FIG. 4 is another perspective diagram of the driving mechanism 100 in FIGS. 1 and 2 after assembly.
Figure 5:
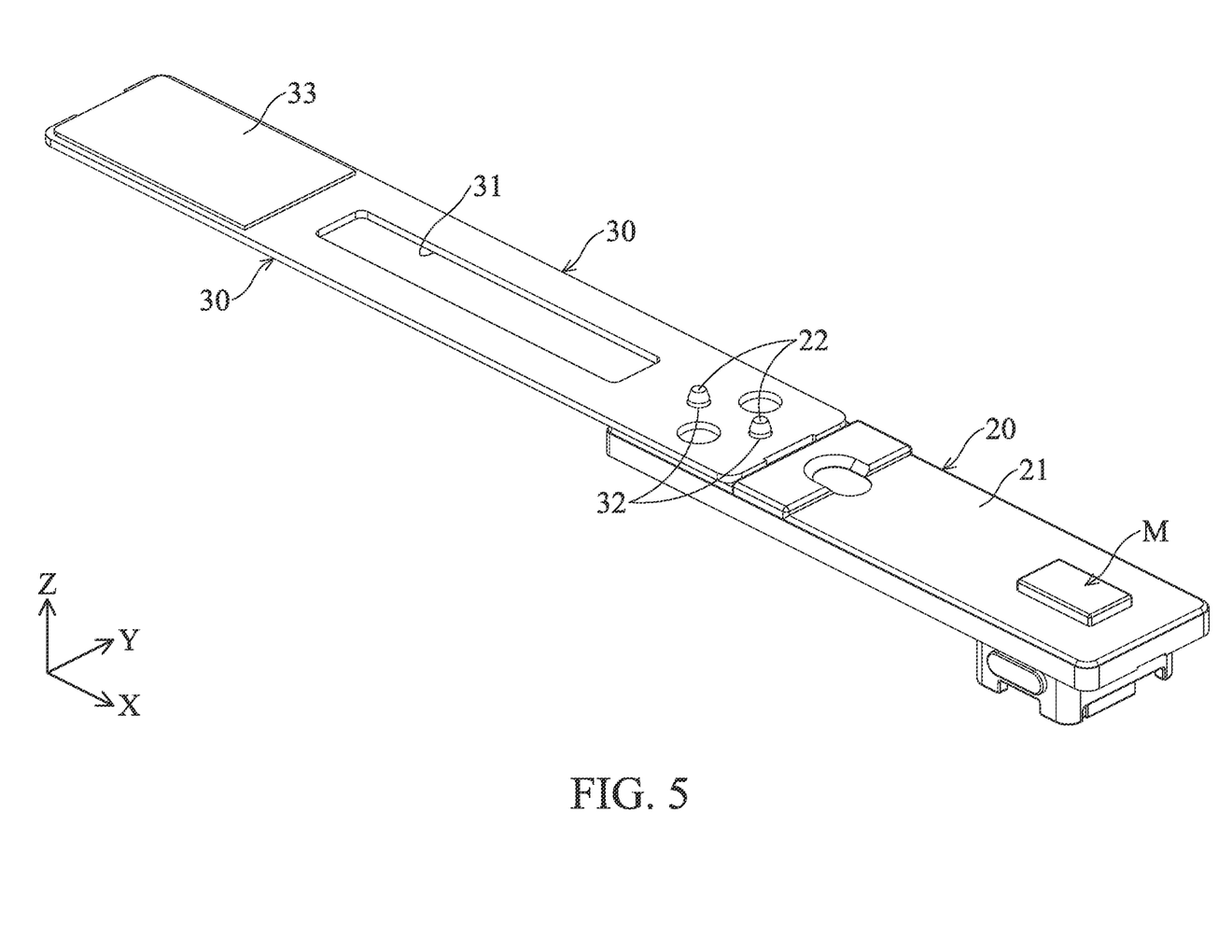
FIG. 5 is a perspective diagram of the magnetic element M, the movable unit 20, and the optical element 30 connected to each other.
Figure 6:
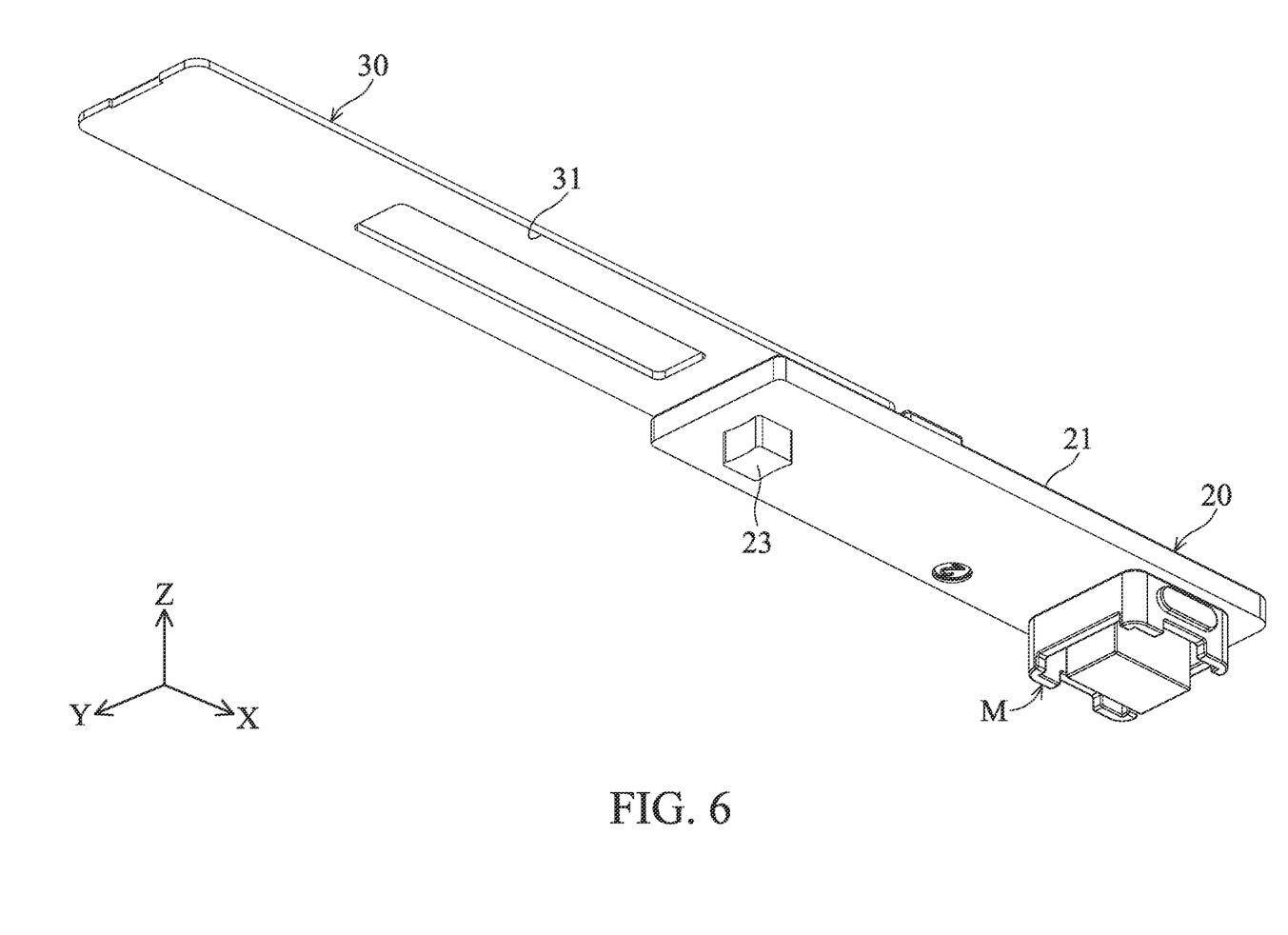
FIG. 6 is another perspective diagram of the magnetic element M, the movable unit 20, and the optical element 30 connected to each other.

FIGS. 1 and 2 are exploded diagrams of a driving mechanism 100, in accordance with an embodiment of the invention. FIG. 3 is a perspective diagram of the driving mechanism 100 in FIGS. 1 and 2 after assembly. FIG. 4 is another perspective diagram of the driving mechanism 100 in FIGS. 1 and 2 after assembly. FIG. 5 is a perspective diagram of the magnetic element M, the movable unit 20, and the optical element 30 connected to each other. FIG. 6 is another perspective diagram of the magnetic element M, the movable unit 20, and the optical element 30 connected to each other.

Referring to FIGS. 1-6, an embodiment of the driving mechanism 100 may be disposed in a cell phone, laptop computer, or other electronic devices. The driving mechanism 100 primarily comprises a housing 10, a longitudinal movable unit 20, an optical element 30, a base 40, a movable part 50, a driving assembly 60, a driving assembly 70, and a magnetic element M.

It should be noted that the movable part 50 may comprise ferromagnetic or magnetic permeable material, and it is rotatably disposed in the base 40. The housing 10 forms three openings 11, 12, and 13, and the movable unit 20 has a protrusion 21 and at least a joining portion 22. The optical element 30 has a slot 31, at least a hole 32, and a light-shading portion 33. Here, the movable unit 20 and the optical element 30 are connected to each other by the joining portions 22 joined in the holes 32.

In some embodiments, the light-shading portion 33 may be used as a camera shutter blade. As the light-shading portion 33 comprises light shading material, light can be prevented from entering the driving mechanism 100 to an image sensor (not shown) in the electronic device.

In some embodiments, the movable unit 20 and the optical element 30 may be integrally formed in one piece. In some embodiments, the optical element 30 may be omitted, and the light-shading portion 33 may be directly disposed on the movable unit 20.

The base 40 forms a nub 41 and a recess 42, wherein the nub 41 penetrates the slot 31 and joined in the opening 13 of the housing 10, whereby the housing 10 is affixed to the base 40. Specifically, the magnetic element M is formed on the movable unit 20 by plastic injection molding, and it protrudes from the top surface 21 of the movable unit 20. Here, the top surface 21 of the movable unit 20 and the magnetic element M are exposed to the top side of the driving mechanism 100 via the opening 12 of the housing 10 after assembly.

Moreover, as shown in FIGS. 1-6, a sliding portion 23 is formed at the bottom of the movable unit 20, and the driving assemblies 60 and 70 are disposed at the bottom of the base 40. Here, the driving assembly 60 has a yoke 61 and a coil 62, and the driving assembly 70 has a yoke 71 and a coil 72, wherein the yokes 61 and 71 extend through the coils 62 and 72.

It should be noted that the driving assembly 60 can generate a magnetic field to drive the movable part 50 to rotate relative to the base 40. Additionally, the driving assembly 70 can generate a magnetic field to drive the magnetic element M, the movable unit 20, and the optical element 30 to move relative to the base 40 along the X axis.

When the movable unit 20 and the optical element 30 are in an initial position relative to the base 40, as shown in FIG. 3, the sliding portion 23 of the movable unit 20 is blocked by the outer surface of the movable part 50, and it cannot slide through the passage G of the movable part 50. In this state, the opening 11 of the housing 10 is not blocked by the light-shading portion 33 of the optical element 30, and light can enter the driving mechanism 100 via the opening 11 and then reach the image sensor in the electronic device.

However, when a specific current is applied to the coil 62 of the driving assembly 60, the driving assembly 60 can generate a magnetic field to rotate the movable part 50 relative to the base 40, whereby the passage G of the movable part 50 is aligned to the sliding portion 23 at the bottom of the movable unit 20. Subsequently, another current can be applied to the coil 72 of the driving assembly 70, whereby a magnetic repulsion force is generated between the driving assembly 70 and the magnetic element M for driving the movable unit 20 and the optical element 30 to move relative to the base 40 from the initial position through the passage G of the movable part 50 to a closed position along the −X direction. In this state, the opening 11 of the housing 10 is blocked by the light-shading portion 33 of the optical element 30, thus preventing light from entering the driving mechanism 100 via the opening 11.

Figure 7:
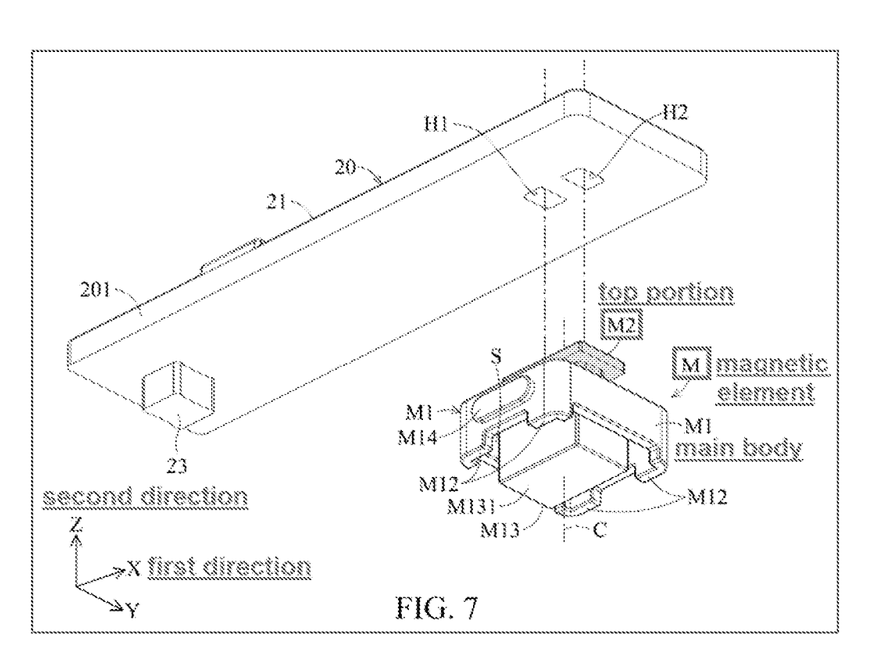
FIG. 7 is an exploded diagram of the magnetic element M and the movable unit 20 before assembly.
Figure 8:
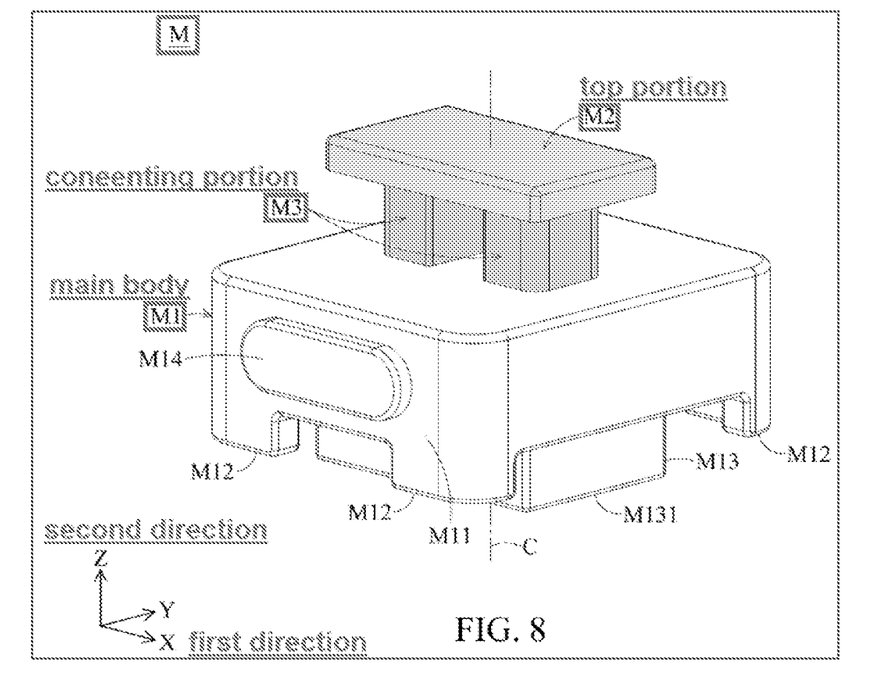
FIG. 8 is a perspective diagram of the magnetic element M.

FIG. 7 is an exploded diagram of the magnetic element M and the movable unit 20 before assembly. FIG. 8 is a perspective diagram of the magnetic element M.

Referring to FIGS. 7 and 8, the movable unit 20 in this embodiment may comprise plastic and/or metal material, and the magnetic element M may be a plastic magnet or injection magnet. Here, the magnetic element M comprises plastic doped with magnetic powder, and it can be directly formed on the movable unit 20 by plastic injection molding. In FIG. 7, the movable unit 20 forms a first hole H1 and a second hole H2 that are arranged in a direction that is parallel to the long axis of the movable unit 20 (X axis).

The magnetic element M has a main body M1, a top portion M2, and two connecting portions M3. The top portion M2 protrudes form the top surface 21 of the movable unit 20 (FIGS. 1, 2, 3, and 5) after the plastic injection molding process, and the two connecting portions M3 extend through the first hole H1 and a second hole H2 of the movable unit 20 to connect the main body M1 and the top portion M2.

In some embodiments, the movable unit 20 may only have the first hole H1 without the second hole H2, and the magnetic element M may only have one connecting portion M3 that extends through the first hole H1. In some embodiments, the movable unit 20 may have more than two holes, and the magnetic element M may have more than two connecting portions M3 extending through the holes, but not limited to the embodiments of the invention.

Since the magnetic element M is integrally formed with the movable unit 20 in one piece by plastic injection molding, the connection strength between the magnetic element M and the movable unit 20 can be enhanced. Moreover, the size and the magnetic field strength of the magnetic element M can also be increased, and the structural design of the magnet can be easier and more flexible. Therefore, efficiency and reliability of the driving mechanism 100 can be greatly improved, and miniaturization of the driving mechanism 100 can also be achieved.

Specifically, the main body M1 has a substantially rectangular structure that primarily forms a wall portion M11, four L-shaped contact portions M12, a central portion M13, and at least a stopper M14. The wall portion M11 surrounds the central portion M13, and a recess S is formed between the wall portion M11 and the central portion M13 (FIG. 7). The stopper M14 protrudes from the outer surface of the wall portion M11. As shown in FIGS. 7 and 8, the four contact portions M12 are located at the four corners of the wall portion M11 and spaced apart from each other. It should be noted that the contact portions M12 protrude from the stopper M14 in a vertical direction (−Z direction) and contact the base 40. When a current is applied to the coil 72 of the driving assembly 70, the magnetic element M, the movable unit 20, and the optical element 30 can be driven to move relative to the base 40 along the X axis, and the contact portions M12 can slide along a guide rail in the recess 42 of the base 40.

Additionally, when viewed along the Z axis, the stopper M14 protrudes from the side surface 201 of the movable unit 20 along the short axis of the movable unit 20 (−Y direction). Hence, when the driving mechanism 100 is impacted by external objects and vibration of the magnetic element M and the movable unit 20 relative to the base 40 occurs, the stopper M14 on the outer surface of the wall portion M11 can contact the base 40 to prevent direct collision and structural damage of the base 40 the movable unit 20. It can be seen in FIG. 7 that the central portion M13 of the main body M1 has an end surface M131 located adjacent to the coil 72 of the driving assembly 70. The end surface M131 is a substantially rectangular or square flat surface, and the central axis C of the magnetic element M extends through the end surface M131

During assembly of the driving mechanism 100, the magnetic element M is formed on the movable unit 20 by plastic injection molding, wherein the two connecting portions M3 of the magnetic element M extend through the movable unit 20 and are spaced apart from each other along the X axis. With the connecting portions M3 connecting the top surface of the main body M1 to the lower surface of the top portion M2, the magnetic element M can be firmly affixed to the movable unit 20.

It should be noted that the polar direction of the magnetic element M is parallel to the Z axis (vertical direction) and perpendicular to the flat movable unit 20. Moreover, as the magnetic element M extends through the movable unit 20, the magnetic poles (N and S) of the magnetic element M are located on opposite sides of the movable unit 20, whereby the size of the magnetic element M can be increased, and the magnetic field strength of the magnetic element M can also be enhanced. Therefore, the efficiency of the driving mechanism 100 can be greatly improved, and miniaturization of the driving mechanism 100 can also be achieved.

In some embodiments, the driving mechanism 100 may be disposed in a foldable laptop computer that has a camera module capable of taking photographs and recording video. For example, the driving mechanism 100 may be used as a camera shutter mechanism that is located close to the display screen of the laptop computer. When the user unfolds or folds the laptop computer, the Hall effect sensor disposed in the main body of the laptop computer can detect the magnetic element M and determine whether the laptop computer is in an open state or in a closed state, thereby facilitating convenient use of the laptop computer.

Figure 9:
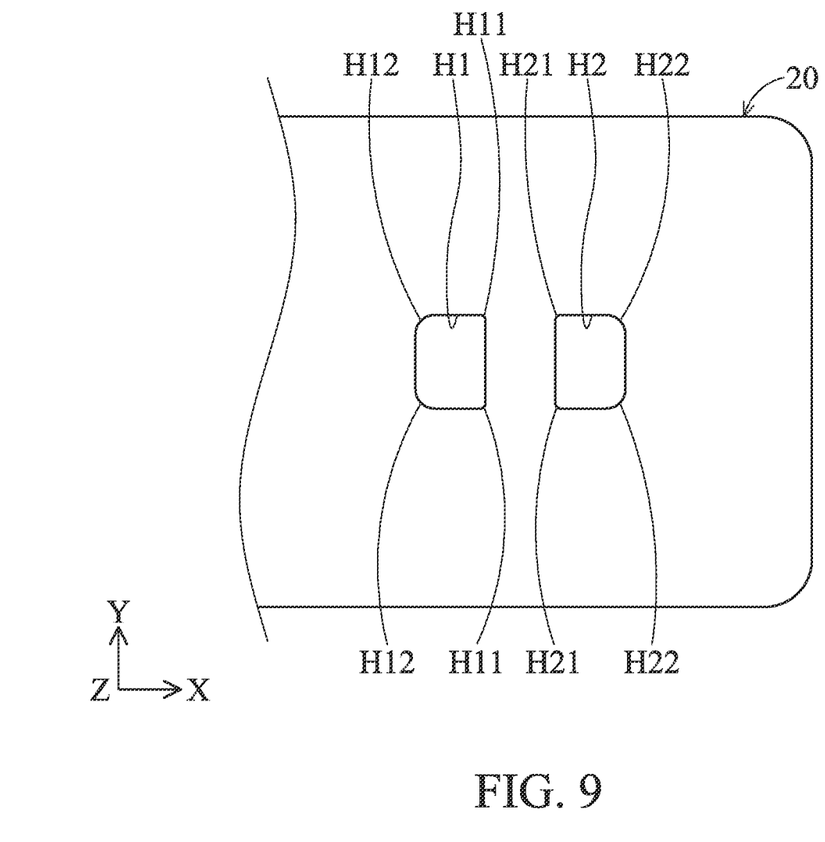
FIG. 9 is an enlarged view of the first and second holes H1 and H2 of the movable unit 20.

FIG. 9 is an enlarged view of the first and second holes H1 and H2 of the movable unit 20.

Referring to FIG. 9, the first hole H1 and the second hole H2 of the movable unit 20 are formed for receiving the two connecting portions M3 of the magnetic element M. The first hole H1 has a substantially rectangular shape and forms a first small filleted corner H11 and a first large filleted corner H12 adjacent to each other. Here, the fillet radius of the first large filleted corner H12 is greater than the fillet radius of the first small filleted corner H11.

Similarly, The second hole H2 has a substantially rectangular shape and forms a second small filleted corner H21 and a second large filleted corner H22 adjacent to each other. Here, the fillet radius of the second large filleted corner H22 is greater than the fillet radius of the second small filleted corner H21.

It can be seen in FIG. 9 that the first and second small filleted corners H11 and H21 are located between the first and second large filleted corners H12 and H22. The first and second small filleted corners H11 and H21 can facilitate precise positioning between the magnetic element M and the movable unit 20. The first and second large filleted corners H12 and H22 can facilitate shock absorption when the driving mechanism 100 is impacted by external objects, thus preventing collision and structural damage of the magnetic element M and the movable unit 20.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism, comprising:
   a base;
   a movable unit, movably disposed on the base, wherein the movable unit is slidable relative to the base in a first direction;
   a magnetic element, disposed on the movable unit and comprising plastic material, wherein the magnetic element has a main body, a top portion, and a connecting portion extending through the movable unit and connecting the main body to the top portion, and the top portion protrudes from a top surface of the movable unit in a second direction that is not parallel to the first direction; and
   a driving assembly, configured to drive the movable unit to move relative to the base, wherein the driving assembly has a coil, and the magnetic element and the movable unit move relative to the base when an electrical current is applied to the coil.

2. The driving mechanism as claimed in claim 1, wherein the second direction is perpendicular to the first direction.

3. The driving mechanism as claimed in claim 1, wherein the movable unit has a flat structure, and the polar direction of the magnetic element is parallel to the movable unit.

4. The driving mechanism as claimed in claim 1, wherein the main body has a central portion and a wall portion surrounding the central portion, and a recess is formed between the central portion and the wall portion.

5. The driving mechanism as claimed in claim 4, wherein the main body further has a plurality of contact portions protruding from the wall portion in a vertical direction and contacting the base.

6. The driving mechanism as claimed in claim 5, wherein the wall portion has a rectangular structure, and the main body has four contact portions located at the four corners of the wall portion.

7. The driving mechanism as claimed in claim 5, wherein each of the contact portions has an L-shaped structure.

8. The driving mechanism as claimed in claim 5, wherein when the magnetic element move relative to the base, the contact portions slide along a guide rail of the base.

9. The driving mechanism as claimed in claim 4, wherein the main body has a stopper protruding from an outer surface of the wall portion.

10. The driving mechanism as claimed in claim 9, wherein the movable unit has a longitudinal structure, and the stopper protrudes from the movable unit in a direction parallel to a short axis of the movable unit.

11. The driving mechanism as claimed in claim 4, wherein the central portion of the main body has an end surface located adjacent to the coil of the driving assembly, and a central axis of the magnetic element extends through the end surface.

12. The driving mechanism as claimed in claim 11, wherein the end surface is a rectangular or square flat surface.

13. The driving mechanism as claimed in claim 1, wherein the magnetic poles of the magnetic element are located on opposite sides of the movable unit.

14. The driving mechanism as claimed in claim 1, wherein the magnetic element comprises a plastic magnet, an injection magnet or magnetic powder.

15. A driving mechanism, comprising:
    a base;
    a movable unit, movably disposed on the base, wherein the movable unit is slidable relative to the base in a first direction;
    a magnetic element, disposed on the movable unit and comprising plastic material, wherein the magnetic element has a main body, a top portion, and two connecting portions connecting the main body to the top portion; and
    a driving assembly, configured to drive the movable unit to move relative to the base, wherein the driving assembly has a coil, and the magnetic element and the movable unit move relative to the base when an electrical current is applied to the coil;
    wherein the movable unit forms a first hole and a second hole arranged along a long axis of the movable unit, and the two connecting portions extend through the first hole and the second hole in a second direction that is perpendicular to the first direction.

16. The driving mechanism as claimed in claim 15, wherein the first hole and the second hole are spaced apart from each other along the long axis.

17. A driving mechanism, comprising:
    a base;
    a movable unit, movably disposed on the base;
    a magnetic element, disposed on the movable unit and comprising plastic material, wherein the magnetic element has a main body, a top portion, and a connecting portion extending through the movable unit and connecting the main body to the top portion; and
    a driving assembly, configured to drive the movable unit to move relative to the base, wherein the driving assembly has a coil, and the magnetic element and the movable unit move relative to the base when an electrical current is applied to the coil;
    wherein the movable unit forms a first hole and a second hole arranged along a long axis of the movable unit, and the magnetic element has two connecting portions extending through the first hole and the second hole;
    wherein the first hole has a rectangular shape and forms a first small filleted corner and a first large filleted corner adjacent to each other, wherein the fillet radius of the first large filleted corner is greater than the fillet radius of the first small filleted corner.

18. The driving mechanism as claimed in claim 17, wherein the second hole has a rectangular shape and forms a second small filleted corner and a second large filleted corner adjacent to each other, wherein the fillet radius of the second large filleted corner is greater than the fillet radius of the second small filleted corner.

19. The driving mechanism as claimed in claim 18, wherein the first and second small filleted corners are located between the first and second large filleted corners.

* * * * *